Figure 1:
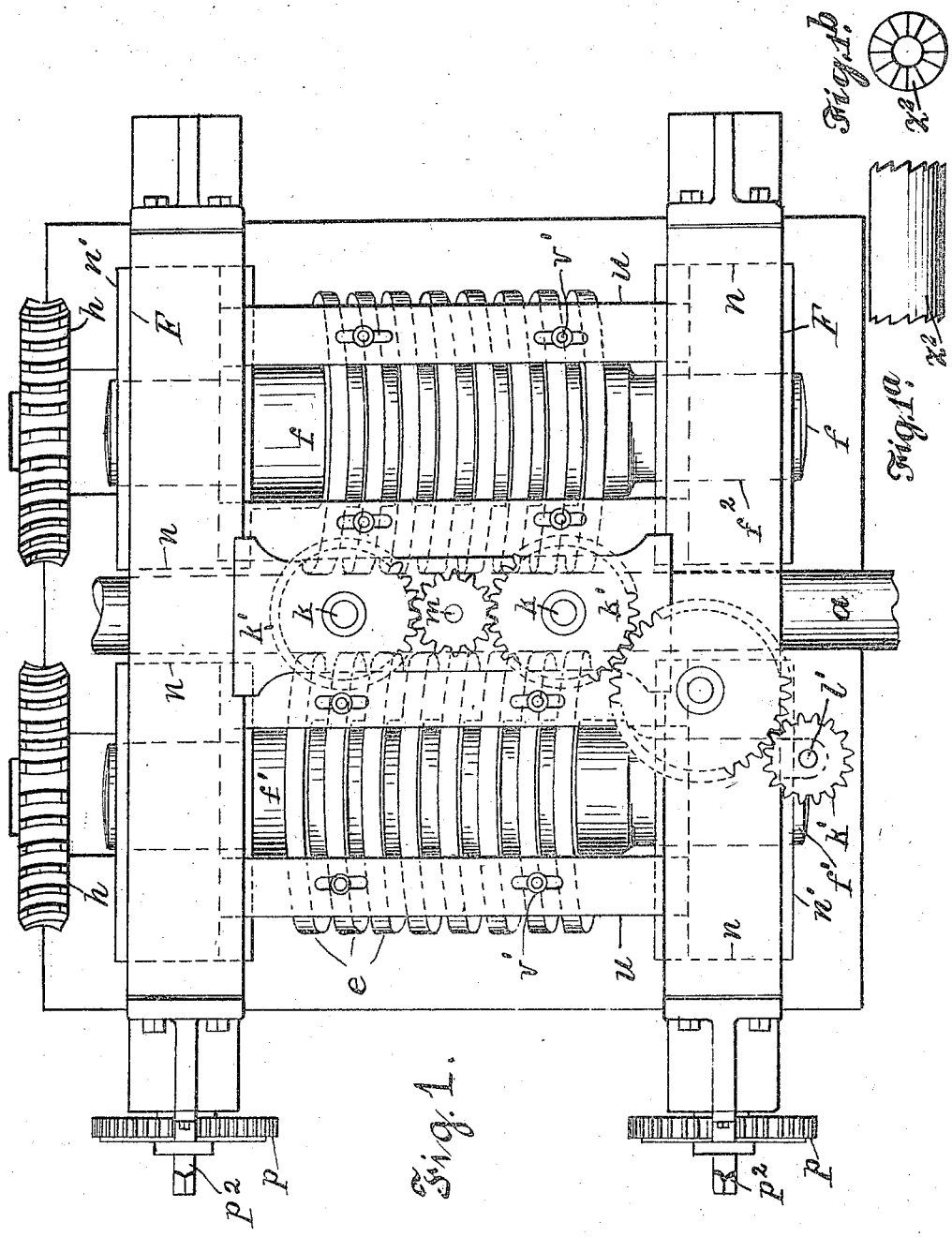

J. W. HYATT.
SHAFT FEEDING DEVICE.
APPLICATION FILED APR. 24, 1917.

1,305,112.

Patented May 27, 1919.
6 SHEETS—SHEET 1.

Inventor.
John Wesley Hyatt,
per Thos. S. Crane, Atty.

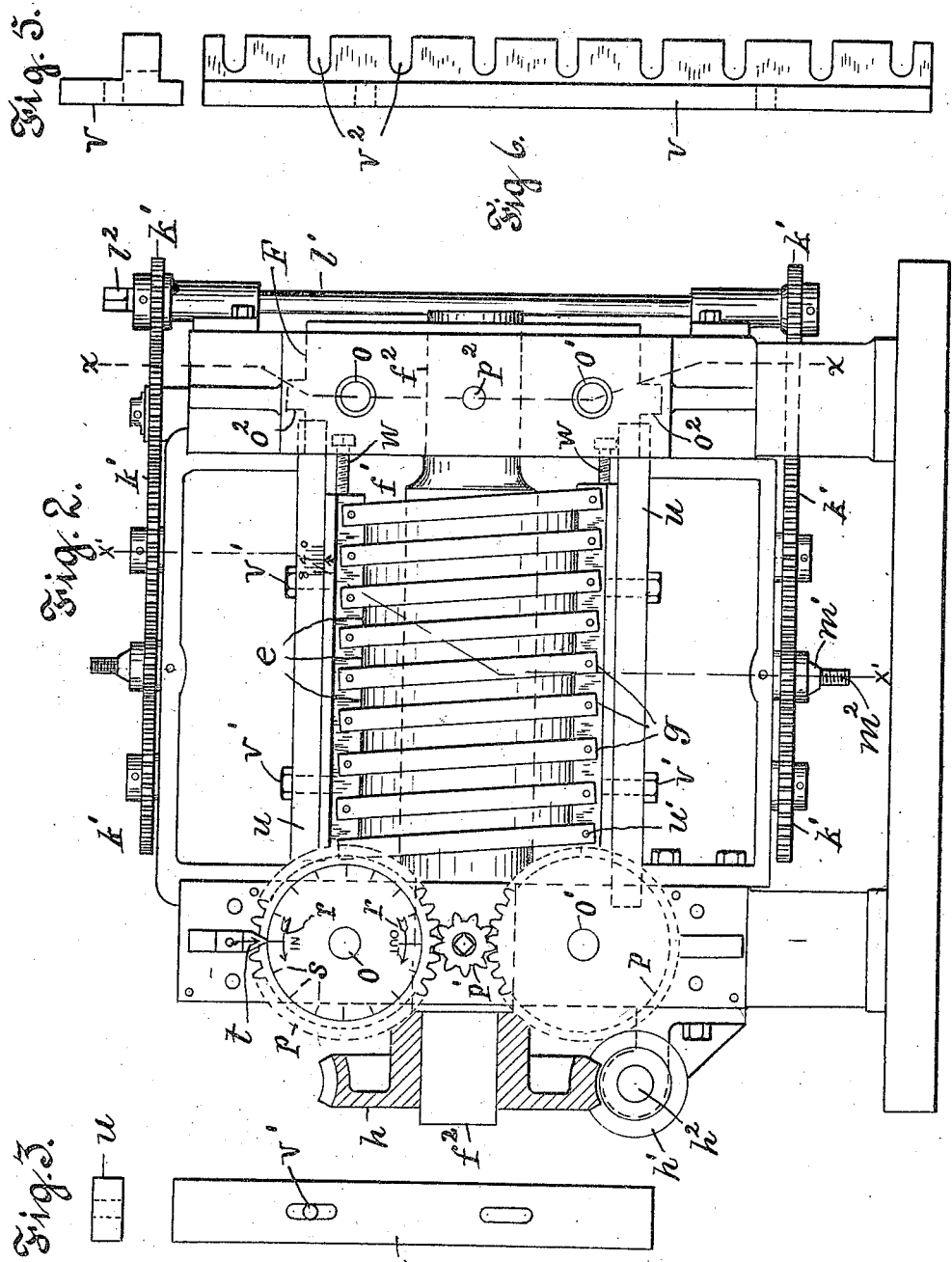

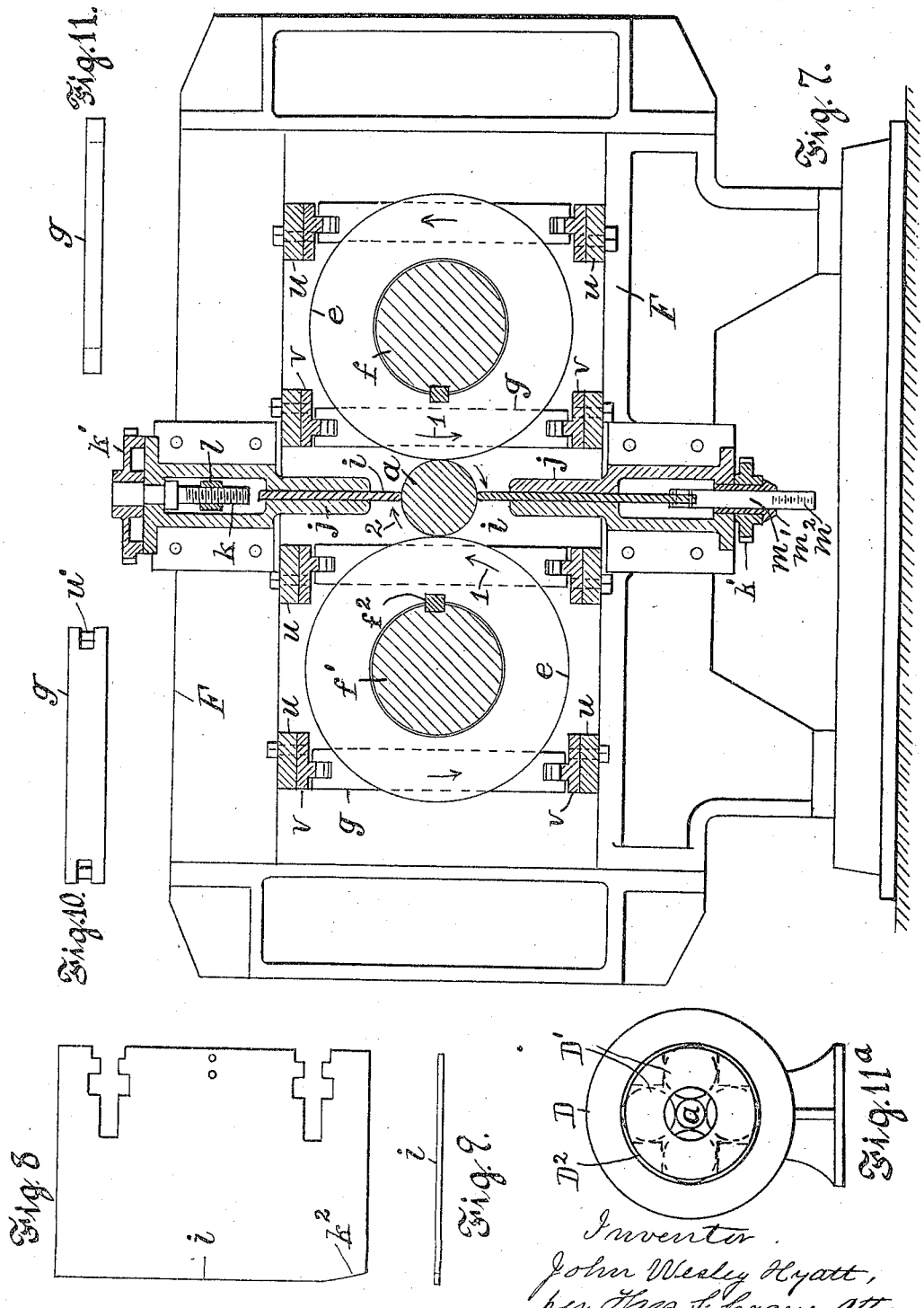

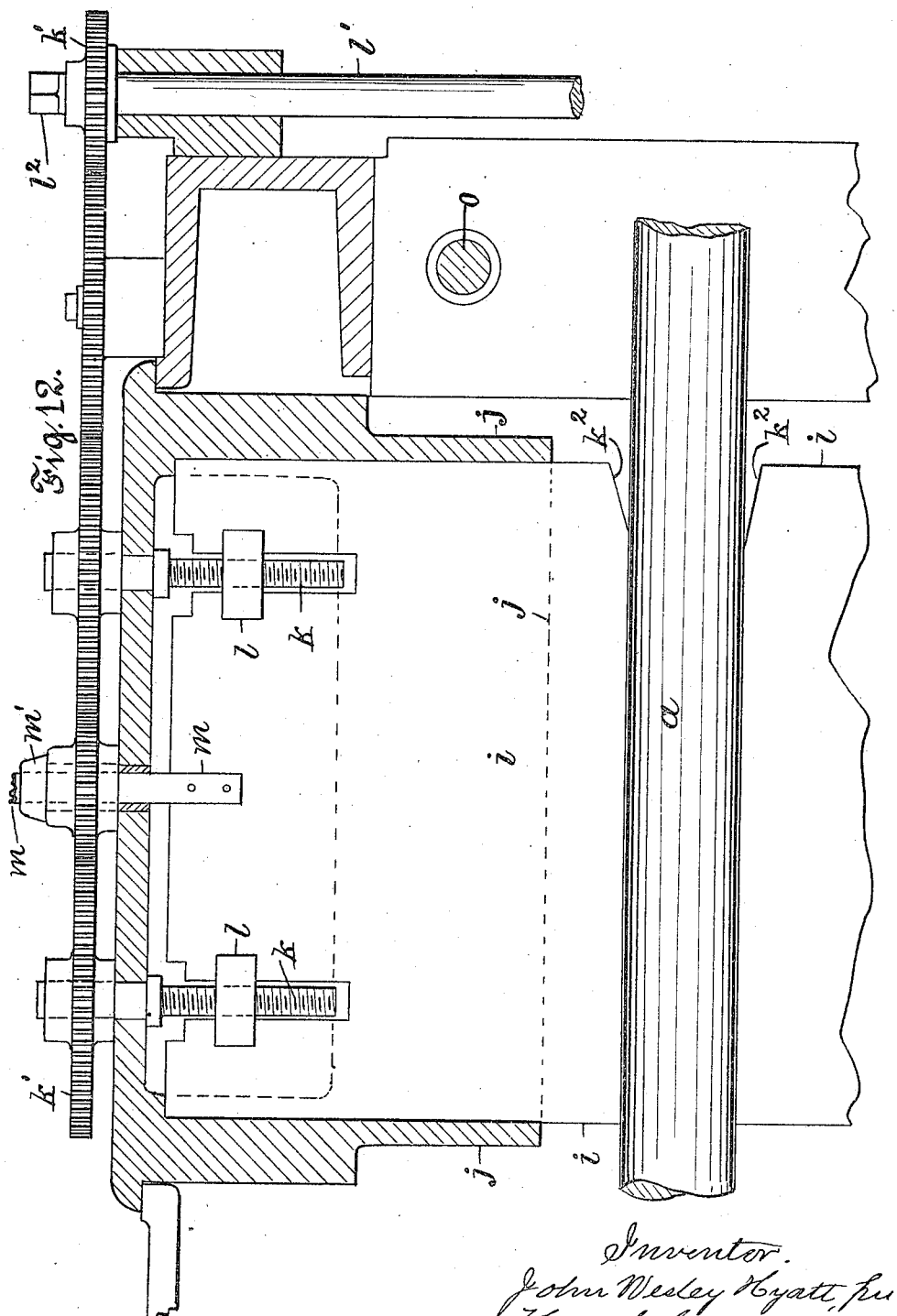

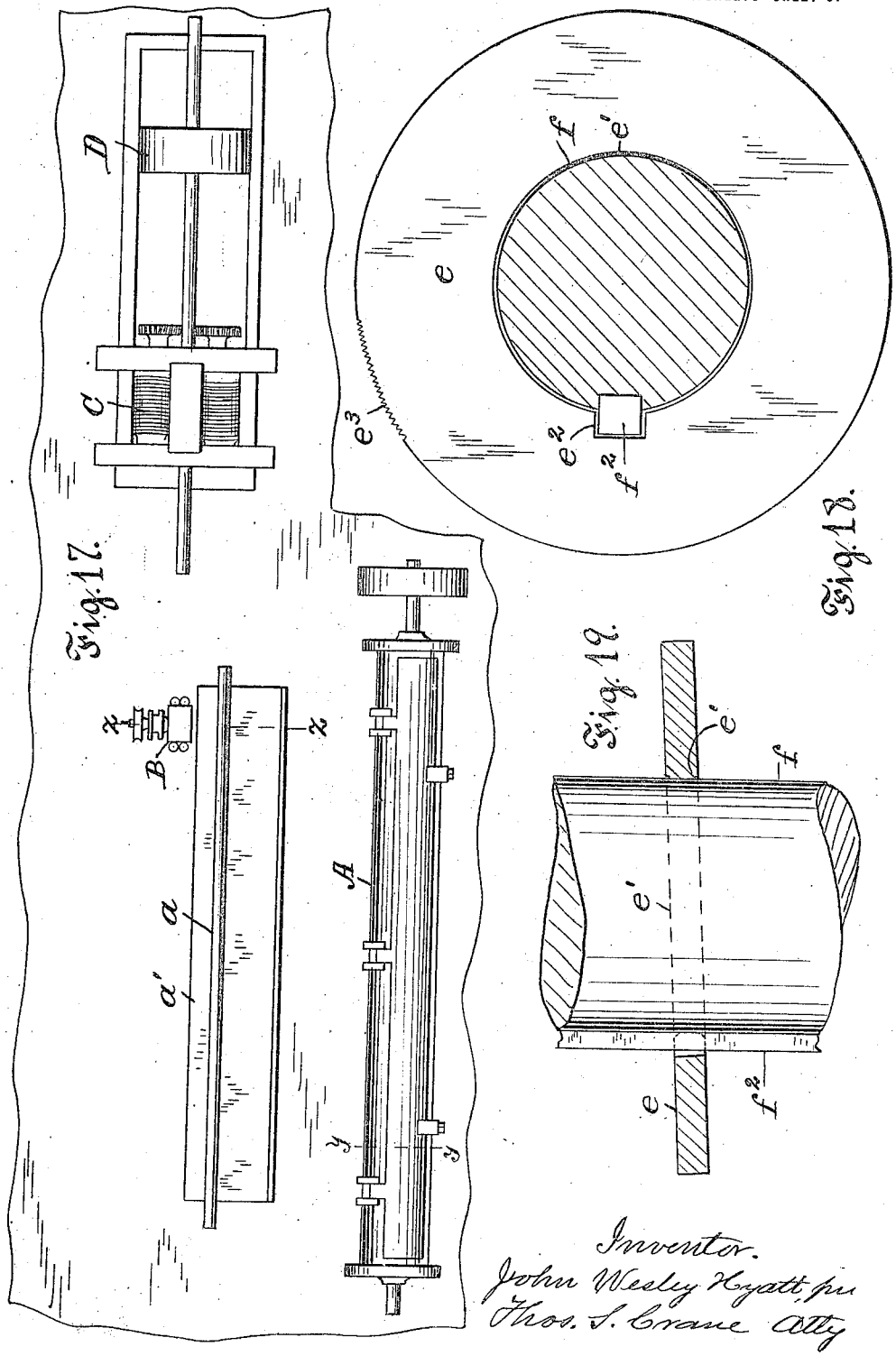

UNITED STATES PATENT OFFICE.

JOHN WESLEY HYATT, OF NEWARK, NEW JERSEY.

SHAFT-FEEDING DEVICE.

1,305,112.  Specification of Letters Patent.  Patented May 27, 1919.

Application filed April 24, 1917. Serial No. 164,244.

*To all whom it may concern:*

Be it known that I, JOHN W. HYATT, a citizen of the United States, residing at Hotel Robert Treat, Park Place, Newark, county of Essex, and State of New Jersey, have invented certain new and useful Improvements in Shaft-Feeding Devices, fully described and represented in the following specification and the accompanying drawings, forming a part of the same.

The present invention relates primarily to means for feeding cylindrical rods, such as shaft-bars and tubing, to a machine for cross-rolling or cold-rolling such rods to reduce them in diameter or finish their surface.

The invention is especially applicable for use with a stationary head containing reducing-rolls, such as is shown and claimed in my allowed application No. 116,765 filed August 25, 1916.

Where a stationary reducing-head is employed, the shaft is reduced by forcing it through the head and simultaneously rotating it to subject its entire surface to the action of the reducing-roll; and the present invention comprises a feeding device for forcibly rotating a shaft-bar, tube, or other cylindrical object, and at the same time propelling it longitudinally. Such means may obviously be applied to other uses for which they may be adapted.

In the annexed drawing, I have shown a series of instrumentalities adapted to operate successively upon a shaft-bar, first to remove the rust from its surface; second, to deliver it to the feeding apparatus; and third, to feed it forcibly to a cold-rolling head or other agency, to operate upon the bar.

The shaft cleaning device consists of a tumbling barrel in which the bars are tumbled over one another with any suitable abrading material to clean off their surface, and thus fit them for cold-rolling without the necessity of pickling the bars.

The delivery apparatus consists of a pair of opposed wheels having each a series of rolls upon its periphery having their axes transverse to the axis of the wheels; so that when the shaft-bar is placed between the wheels it is propelled forward by the rotation of the wheels, but is free to revolve by its support upon the rolls.

Such delivery-wheels are arranged in line with the inlet of the feeding device, which comprises two shafts parallel with one another and having each a series of disks fitted loosely thereon and rotated thereby, between which disks the shaft-bar is inserted. The disks are held during their rotation at a certain inclination to their respective shafts which inclination operates when they are pressed upon the shaft-bar to propel it forward while rotating it, and such advancing and rotary movement is adapted to subject the shaft-bar to the operation of the reducing-rolls, into which it is directly forced by the feeding device.

Figure 13:
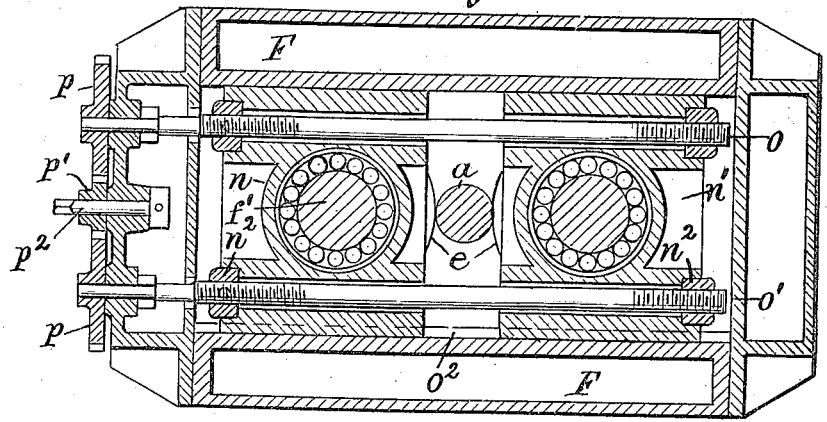
Figure 14:
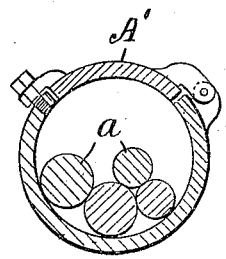
Figure 15:
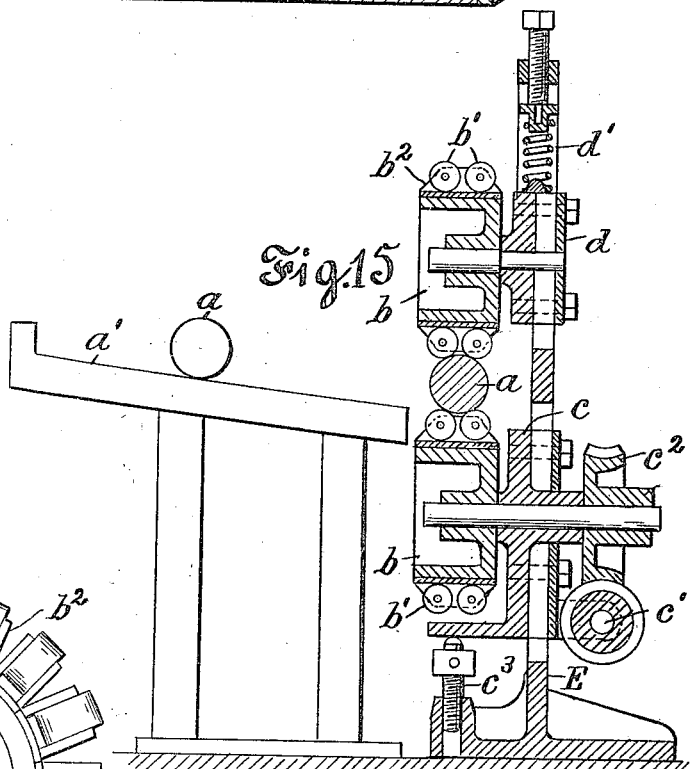
Figure 16:
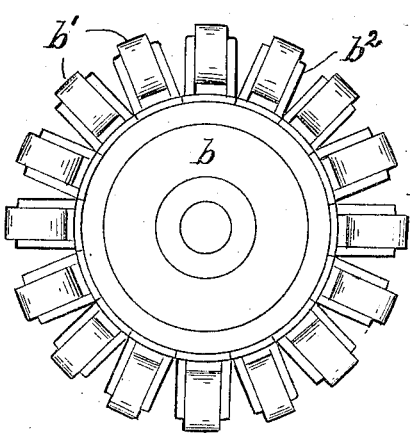

The invention will be understood by reference to the annexed drawing, in which Figure 1 is a plan of the feeding device; Figs. 1ᵃ and 1ᵇ are side and end views of a coupler; Fig. 2 is a side elevation of the feeding device with the worm-wheel in section; Fig. 3 is an end view, and Fig. 4 a plan of one of the seat-bars for the disk abutment or thrust-bars. Fig. 5 is an end view, and Fig. 6 a side view similar to that appearing in Fig. 2, of one of the shifter-bars for the same abutment-bars. Fig. 7 is a vertical section of the feeding device taken on line $x'$—$x'$, in Fig. 2; Fig. 8 is an elevation, and Fig. 9 an end view of one of the guides for centering the shaft-bar between the disks. Fig. 10 is an edge view, and Fig. 11 a side view of one of the abutment-bars for holding the disks inclined. Fig. 11ᵃ is an end view of the reducing-head. Fig. 12 is a vertical section of the upper guide and its adjusting means taken at the face of the guide in Fig. 7, and shown upon a larger scale than the preceding figures. Fig. 13 is a vertical section of the body of the frame and its bearings taken on line $x$—$x$ in Fig. 2; Fig. 14 is an enlarged cross section of the tumbling barrel taken on line $y$—$y$ in Fig. 17; Fig. 15 is a vertical section of the delivery-wheels and their connections taken on line $z$—$z$ in Fig. 17; Fig. 16 is an elevation of one of the delivery-wheels upon a larger scale than Fig. 15; and Fig. 17 is a plan of the tumbling barrel, delivery-wheels, feeding device and reducing-head. Fig. 18 is an end view of the shaft $f$ and one disk $e$, and Fig. 19 is a side view of the same.

Referring to Fig. 17, A designates the tumbling barrel for cleaning shaft-bars, and B the delivering device which receives the shaft-bar $a$ from an inclined table $a'$ on which it is placed when cleaned. C designates the feeding device and D the reducing-head, which may be of the form shown in Fig. 11ª and in my allowed application, or any other form which requires the shaft to be rotated when moved through such reducing-head.

Fig. 11ª shows the reducing-rolls D' guided by a cage D². Figs. 15 and 16 show the delivering device formed of two wheels $b$ having rolls $b'$ mounted in bearings $b^2$ upon their periphery. Each bearing carries two of the rolls $b'$, and the wheel thus carries two series of the rolls upon its periphery, which rolls are journaled to turn freely in their bearings. The shaft-bar contacts with the successive pairs of rolls, lying between them and turning them freely when the shaft-bar is grasped by the rotating feeding-device.

The rolls $b'$ thus form a continuous support for the shaft which fits between the adjacent faces of the rolls upon each wheel.

One of the wheels is mounted in a bearing $c$ which is movable in a standard E which carries a worm-shaft and worm $c'$, and the wheel is provided with a worm-wheel $c^2$ and is thus rotated by the worm. This bearing is adjustable by a screw $c^3$. The other wheel is mounted upon a bearing $d$ pressed toward the bearing $c$ by a spring $d'$, which yields when inserting the shaft-bar between the wheels.

The shaft-bar $a$ when inserted between the rolls upon the two wheels is propelled by the rotation of the lower wheel into the feeding device and when grasped by the feed-disks of such device is immediately rotated, and such rotation is permitted by the rolls $b'$.

The feeding agent consists of disks $e$ mounted loosely upon two shafts $f, f'$, set parallel to one another and adjustable to and from one another so as to press the edges of the disks against the shaft-bar $a$, as shown in Fig. 7.

Fig. 2 shows a series of eight disks upon each shaft held at an inclination to the shaft by abutment or thrust-bars $g$ which are held adjustably at their opposite ends so that the inclination of the disks may be varied.

Such inclination is permitted by making the bore of each disk sufficiently larger than the driving-shaft to permit the maximum tipping that may be required, as shown in Fig. 19.

When in operation, the bore of the disk touches the shaft only at the side marked $e'$ in Figs. 18 and 19, where the pressure is exerted, and clears the shaft at other points, as shown in Fig. 18. The key-notch $e^2$ in the disk is fitted loosely to the key $f^2$ upon the shaft, by which key the disks are driven. The disk shifts its point of contact $e'$ as the shaft revolves. A great deal of oil is supplied to the shaft-bar during the feeding operation, and the peripheries of the disks are formed with very fine teeth shown on one part of the rim only at $e^3$ in Fig. 19, to give the disks a positive grip upon the bar.

Figs. 2 to 6 inclusive show means for tipping the abutment-bars and securing them in their adjusted position, such means consisting of seat-bars $u$ extended adjacent to the edges of the disks $e$ parallel with the driving-shafts and fixed to the bearing-blocks $n$ and $n'$. Upon these seat-bars, shifter-bars $v$ are mounted and said shifter-bars are connected to the shifter-bars by bolts and screw-connections $v'$. Swiveled set-screws $w$ shown in Fig. 2, serve to adjust the shifter-bars lengthwise.

The shifter-bars are provided each with a rib having a series of notches $v^2$, and the abutment-bars are forked at their ends to embrace the said rib and provided each with a transverse pin $u'$ to enter the notch $v^2$. The shifter-bars when adjusted and secured by the bolts $v'$ thus hold the abutment-bars at the desired angle between the several disks $e$ upon the shafts $f, f'$.

It is immaterial what means be employed for adjusting the abutment and holding it to support the disks $e$ in their inclined positions.

The disks by their loose connection with the shaft, are driven thereby in their inclined position, and the inclined line of contact between the disks and the shaft-bar causes the latter to advance while it is rotated by the disks. It may thus be forced through the reducing-head between the rolls D' by which it is rolled with the force desired to reduce or polish the shaft-bar.

The driving-shafts are driven in the same direction, by worms operating upon worm-wheels $h$ shown in Fig. 1, the worms $h'$ being mounted upon the same shaft $h^2$ as shown in Fig. 2.

The rotation of the driving-shafts in the same direction, as shown in Fig. 7, rotates the adjacent edges of the disks in opposite directions as shown by the arrows 1, which is required to rotate the shaft-bar $a$ in the direction of the arrows 2.

Guides formed as plates $i$ are fitted to bear upon opposite sides of the shaft-bar intermediate to its points of contact with the disks, so as to center the shaft between the disks.

The guide-plates are mounted in carriers $j$ shown in Figs. 7 and 12, which are fixed to the frame of the machine above and below the shaft-bar respectively, and are provided with screws $k$ fitted to nuts $l$ upon the guide plate. The screws are connected by separate trains of gearing or cog-wheels $k'$ with a manual shaft $l'$ shown in Fig. 12 with a square $l^2$ upon its upper end to which a crank can be applied for turning it.

One of the guide-plates is shown separately in Figs. 8 and 9, and is shown in Fig.

12 provided with a bar $m$ which slides through a fixed sleeve $m'$ in the hub of one of the intermediate gears, and is marked with a scale $m^2$ to indicate, by its projection beyond such sleeve, the adjustment of the guide-plate.

Each of the guide-plates, as shown in Figs. 8 and 12, is beveled at $k^2$ to facilitate the entrance of the shaft-bar $a$ between the plate, and the scale $m^2$ permits the adjustment of the guide-plates to fit any size of shaft-bars to be passed through the feeding device.

The driving-shafts $f$, $f'$, of the disks are similarly adjustable, as shown in Fig. 13, the shafts being mounted in roller-bearings in bearing-blocks $n$, $n'$, fitted to grooved ways $o^2$ upon the ends-bars of the frame, and connected by two right and left screws $o$ and $o'$, the rotation of which moves the bearings of the shafts to or from one another.

Each bearing-block is provided with two nuts $n^2$ upon its outer ends, and the two screws are fitted to the said nuts and their ends extended through the side of the frame and connected by gears $p$ and an intermediate cog-wheel $p'$.

This cog-wheel is attached to a shaft $p^2$ squared upon its outer end to receive a wrench or crank, by which the bearing-blocks may be adjusted.

Fig. 2 shows upon one side of the frame the cog-wheels $p$ and $p'$, upon the upper of which scale-marks $s$ are shown with arrows $r$ indicating the direction of rotation to move the bearing-blocks inward and outward.

The wheels $p$ and $p'$ are omitted from the right hand side of Fig. 2, to show the location of the right and left screws in relation to the journals $f^2$ of the shafts $f$ or $f'$.

An index $t$ is fixed to the frame to denote the position of the scale-marks $s$, and the scale and index thus enable the operator to set the bearing-blocks in the position required to operate upon any sized shaft-bar within the capacity of the feeding device, and to press the disks firmly against the shaft-bar to propel the same.

It is obvious that if this feeding device be made of suitable strength the disks are perfectly adapted to reduce the shaft-bar while it is rotated and propelled through the feeding-disks. I do not therefore limit myself to the use of the disks for the mere feeding of the shaft-bars forwardly.

When the feeding device simultaneously rotates and propels the shaft-bar, the reducing-head is a passive instrument through which the shaft-bar is forced to reduce and finish it, and it is evident that when the shaft-bar passes beyond the grip of the feed-disks it would cease to move through the reducing-head.

To enable the successive bars to propel and rotate those which precede them, I employ the coupler $z^2$ consisting of a cylindrical block having radial sloping teeth upon its ends (as shown in Figs. 1ª and 1ᵇ) which may be inserted between the adjacent ends of the bars; and the advancing movement of the rear bar then forces the teeth to engage the adjacent ends of the bars, which results in the rotation and pushing forward of the previous bar. Each bar in succession thus pushes a preceding bar through the head with the coupler, which can then be recovered and applied between the following bars.

Couplers of suitable diameters are used for shafts of different sizes, so as to pass between the reducing rolls in the head D.

Having thus set forth the nature of the invention what is claimed herein is:

1. Means for rotating and feeding a shaft-bar, consisting of two parallel driving shafts having each a series of feed-disks fitted loosely thereon and driven thereby and sustained rotatably at an inclination to the shafts, means for supporting the shaft-bar rotatably in contact with the feed-disks, and means for pressing the disks upon the shaft-bar.

2. Means for rotating and feeding a shaft-bar, consisting of two parallel shafts having each a series of feed-disks fitted loosely thereto and rotated thereby, adjustable means for inclining the feed-disks in opposite directions respectively upon the two shafts, and means for pressing the disks upon the shaft-bar.

3. Means for rotating and feeding a shaft-bar, consisting of two parallel shafts having each a series of feed-disks driven thereby, and a series of adjustable inclined supports intermediate such disks supporting them at an inclination to the shafts when in operation.

4. Means for rotating and feeding a shaft-bar, consisting of two driving-shafts mounted parallel to one another, a series of feed-disks fitted loosely to each of said shafts and driven thereby to press upon opposite sides of the shaft-bar, means for supporting the two series of disks upon the driving-shafts in oppositely inclined relations to the shaft-bar, and guides applied to the opposite intermediate sides of the shaft-bar to hold the same in an operative relation to the feed-disks.

5. Means for rotating and feeding a shaft-bar, consisting of two driving-shafts mounted parallel to one another and having feed-disks carried thereon to press upon the sides of the shaft-bar, guides applied to the intermediate sides of the shaft-bar, and means for simultaneously adjusting the guides into contact with the shaft-bar.

6. Means for rotating and feeding a shaft-bar, consisting of two driving-shafts mounted parallel to one another and having a series of feed-disks fitted thereon and driven thereby, with their edges adjacent, to operate upon an interposed shaft-bar, guide-carriers sustained above and below the shaft-bar with guides movable therein to center the said bar, gearing upon the carriers for adjusting the guides, and a manual shaft connecting the two gearings to adjust the guides simultaneously.

7. Means for rotating and feeding a shaft-bar, consisting of two driving-shafts mounted parallel to one another, a series of feed-disks fitted loosely to each of the said driving-shafts and driven thereby, and abutment or thrust-bars arranged intermediate to the several disks of each series and having their upper and lower ends supported adjustably to produce an inclination of the feed-disks to the driving-shafts.

8. Means for rotating and feeding a shaft-bar, consisting of two driving-shafts mounted parallel to one another, a series of feed-disks fitted loosely to each of the said driving-shafts and driven thereby, abutment or thrust-bars arranged intermediate to the several disks of each series, fixed seats adjacent the opposite ends of the abutment-bars, and shifter-bars mounted adjustably upon the fixed seats and engaged with the ends of the abutment-bars to tip them as desired, for inclining the feed-disks.

9. Means for rotating and feeding a shaft-bar, consisting of a frame with two bearings fitted adjustably in each end of the frame, driving-shafts supported in the bearings, a series of feed-disks fitted to each driving-shaft and driven thereby, with means for holding them at an inclination to the shaft, and means for adjusting the bearings to and from one another upon the frame, to press the disks upon a shaft-bar.

10. Means for rotating and feeding a shaft-bar, consisting of a frame with two bearings fitted adjustably in each end of the frame, driving-shafts supported in the bearings, a series of feed-disks fitted to each driving-shaft and driven thereby, with means for holding them at an inclination to the shaft, seats upon the frame above and below the adjacent edges of the feed-disks, guides supported adjustably upon the said seats, means for adjusting the guides to and from a shaft-bar when inserted between the feed-disks, and means for adjusting the bearings of the driving-shafts in relation to one another to press the feed-disks upon a shaft-bar.

11. The combination, with a reducing-head and a feeding device having means to rotate and propel a shaft-bar to the said head, of delivery-wheels constructed and arranged to automatically grasp a shaft-bar and hold it rotatably, and at the same time positively propel it to the feeding device.

12. The combination, with an apparatus for cold-rolling shafting, of a tumbling barrel for cleaning the shaft-bars, delivery-wheels adjacent to the tumbling barrel to receive shaft-bars and automatically propel them forward, and a feeding-device arranged and operated to receive the shaft-bars from the delivery-rolls, and positively propel and rotate them for engagement with the cold-rolling apparatus.

13. An apparatus for cold-rolling shafting, consisting of a reducing-head, a feeding device having means for rotating and propelling a shaft-bar and a coupler for connecting the adjacent ends of two shaft-bars, whereby the feeding device may cause a succeeding shaft-bar to rotate and propel a preceding shaft entirely through the reducing-head.

14. The combination, with a reducing-head and a feeding device having means for rotating and propelling a shaft-bar, of a coupler for connecting successive shaft-bars, consisting of a cylindrical block with radial transversely sloping teeth upon its opposite ends, whereby the feeding device may cause a succeeding shaft-bar to rotate and propel a preceding shaft-bar entirely through the reducing-head.

In testimony whereof I have hereunto set my hand.

JOHN WESLEY HYATT.